(12) United States Patent
Tobias

(10) Patent No.: US 10,832,111 B1
(45) Date of Patent: Nov. 10, 2020

(54) SECURITY MEDALLION

(71) Applicant: Marc Tobias, Pittsburgh, PA (US)

(72) Inventor: Marc Tobias, Pittsburgh, PA (US)

( * ) Notice: Subject to any disclaimer, the term of this patent is extended or adjusted under 35 U.S.C. 154(b) by 0 days.

(21) Appl. No.: 16/732,835

(22) Filed: Jan. 2, 2020

Related U.S. Application Data

(63) Continuation-in-part of application No. 15/730,210, filed on Oct. 11, 2017, now Pat. No. 10,565,839.

(60) Provisional application No. 62/411,848, filed on Oct. 24, 2016.

(51) Int. Cl.
*G06K 19/07* (2006.01)

(52) U.S. Cl.
CPC .................. *G06K 19/0723* (2013.01)

(58) Field of Classification Search
CPC ....... C09D 11/033; C09D 11/36; C09D 11/38; C09D 11/50; C09D 11/52; C09D 11/102; C09D 11/106; C09D 11/30; G02B 5/20; H01L 2251/552; H01L 51/50; H01L 51/5012; H01L 51/5088; H01L 27/322; H01L 27/3244; H01L 51/0005; H01L 51/0007; H01L 51/0012; H01L 51/0026; H01L 51/0039; H01L 51/004; H01L 51/0043; H01L 51/005; H01L 51/0078; H01L 51/0081; H01L 51/0085; H01L 51/0087; H01L 51/0091; H01L 51/5004; H01L 51/5056; H01L 51/5096; H01L 51/52; H01L 51/56; H05B 33/10; H05B 33/12; H05B 33/22; B05D 7/24; C09K 11/02; C09K 11/06; C09K 11/661; C09K 2211/1011; C09K 2211/1029; C09K 2211/1425; C09K 2211/185; C23C 14/06

USPC ... 340/572.1, 573.1, 573.3, 568.1, 552, 555, 340/568.8, 568.5, 568.3, 568.4, 571, 340/691.6, 692

See application file for complete search history.

(56) References Cited

U.S. PATENT DOCUMENTS

| | | |
|---|---|---|
| 5,381,685 A | 1/1995 | Carl |
| 5,667,187 A | 9/1997 | Doman |
| 6,305,656 B1 | 10/2001 | Wemyss |
| 10,565,839 B1 * | 2/2020 | Tobias ............... G08B 13/1427 |
| 2003/0194484 A1 * | 10/2003 | Yamazaki ............... C23C 14/24 427/66 |
| 2007/0229962 A1 * | 10/2007 | Mason, Jr. ........... C11D 17/049 359/609 |
| 2013/0173358 A1 * | 7/2013 | Pinkus ............... G06Q 30/0265 705/14.1 |
| 2013/0316114 A1 * | 11/2013 | Hwang .................. B32B 27/36 428/41.7 |
| 2015/0242895 A1 | 8/2015 | Brown |

(Continued)

*Primary Examiner* — Daniel Previl
(74) *Attorney, Agent, or Firm* — Jeffrey A. Proehl; Woods, Fuller, Shultz & Smith, PC

(57) ABSTRACT

A security medallion for a portable object may include a housing and a mechanical interface formed in the housing that may be configured to receive a laptop lock. The security medallion may also include a circuit board positioned within the housing that may be operable to provide electronic monitoring of the security medallion. The security medallion may further include a power source positioned within the housing and coupled to the circuit board, and an attachment member supported on the housing and having an adhesive configured to selectively bond to the portable object. The adhesive may be releasable from the portable object by application of a release means.

19 Claims, 12 Drawing Sheets

(56) References Cited

U.S. PATENT DOCUMENTS

2016/0343224 A1 11/2016 Markwell
2016/0378140 A1* 12/2016 Bergmann .............. B32B 3/263
                                                            361/679.26
2017/0312578 A1 11/2017 Tran

* cited by examiner

SECURITY MEDALLION

REFERENCE TO RELATED APPLICATIONS

This application is a continuation-in-part of U.S. patent application Ser. No. 15/730,210, filed Oct. 11, 2017, which claimed the benefit of U.S. Provisional Application No. 62/411,848, filed Oct. 24, 2016, each of which is hereby incorporated in its entirety.

BACKGROUND

The present invention relates to a security medallion for portable objects, such as portable electronic devices.

SUMMARY

In one embodiment, the invention provides a security medallion for a portable object. The security medallion includes a housing and a mechanical interface formed in the housing. The mechanical interface is configured to receive a laptop lock. The security medallion also includes a circuit board positioned within the housing. The circuit board is operable to provide electronic monitoring of the security medallion. The security medallion further includes a power source positioned within the housing and coupled to the circuit board, and an attachment member supported on the housing and having an adhesive configured to selectively bond to the portable object. The adhesive being releasable from the portable object by application of a release means.

In some embodiments, the adhesive is releasable from the portable object electrically or electronically, through introduction of light at specific frequencies, through introduction of audio energy or sound at specific frequencies, and/or through introduction and release of micro bubbles.

In some embodiments, the release means includes a magnetic field, an electrical field, or a radio frequency energy field.

Other aspects of the invention will become apparent by consideration of the detailed description and accompanying drawings.

DETAILED DESCRIPTION

Figure 1:
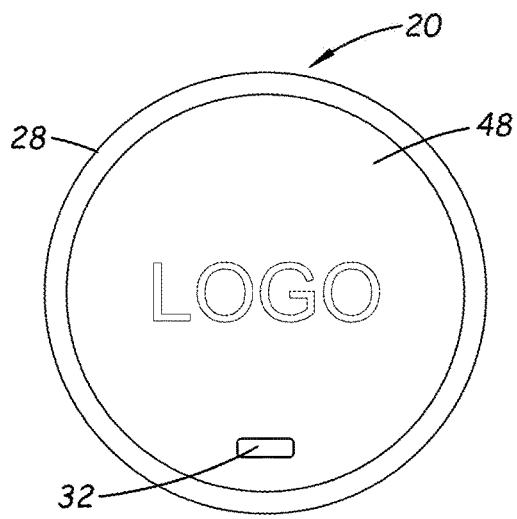
FIG. 1 is a schematic top view of a security medallion embodying the invention.
Figure 2:
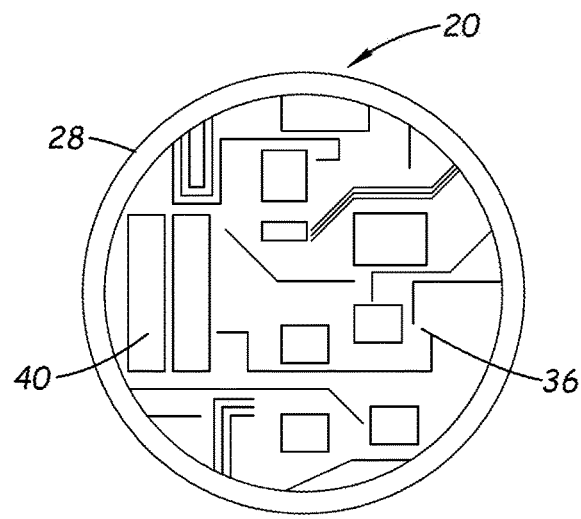
FIG. 2 is a schematic top view of the security medallion of FIG. 1 with a cover removed.
Figure 3:
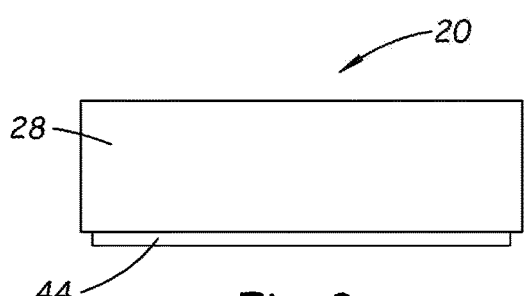
FIG. 3 is a schematic side view of the security medallion of FIG. 1.
Figure 4:
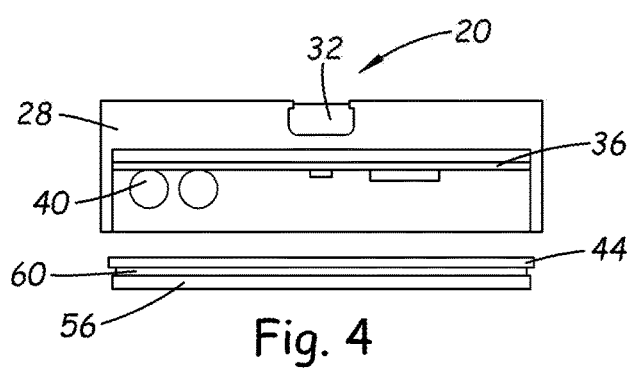
FIG. 4 is a schematic exploded, cross-sectional view of the security medallion of FIG. 1.
Figure 5:
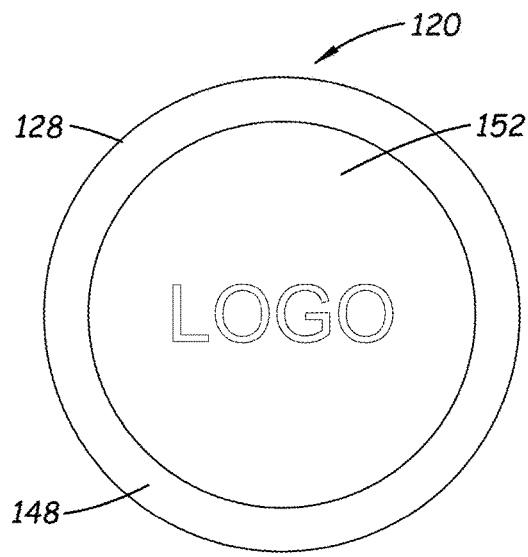
FIG. 5 is a schematic top view of another security medallion embodying the invention.
Figure 6:
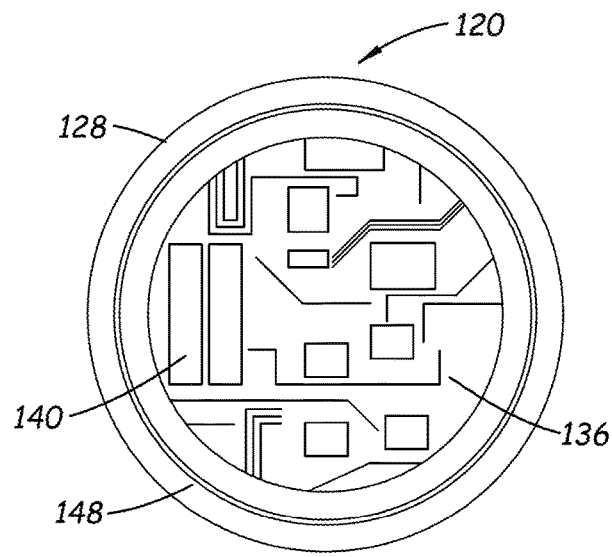
FIG. 6 is a schematic top view of the security medallion of FIG. 5 with a cover removed.
Figure 7:
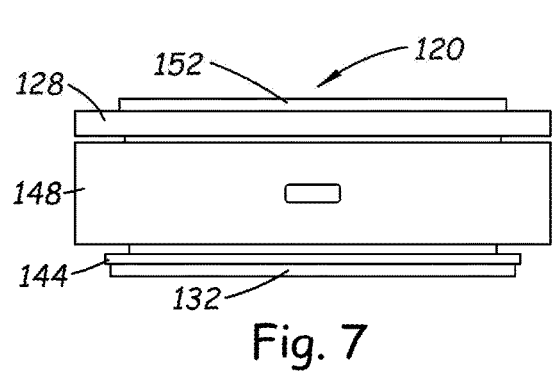
FIG. 7 is a schematic side view of the security medallion of FIG. 5.
Figure 8:
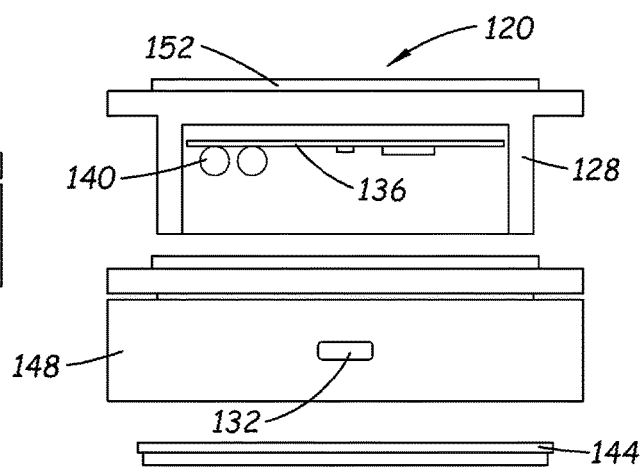
FIG. 8 is a schematic exploded side view of the security medallion of FIG. 5.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Corporations routinely lease laptops and other electronic devices that they want to be returned undamaged at the end of the lease. The applicants have recognized that currently there is no way to effectively affix a security device that does not damage the case or outer layer of the computer when removed, if the housing or case of the electronic device has not been provided with a special mechanical interface. For example, a specialized slot, sometimes referred to as a "Kensington security slot," may be integrally formed in the case of the electronic device to be engaged by an external lock element which has portions able to extend into the slot and secure the lock element to the case of the electronic device via the slot. While lock elements utilizing the slot can be highly effective for securing the electronic device (such as through the use of a cable attached to the lock elements), the presence of the specialized slot in the case of the electronic device is thought to be critical to the effectiveness of this approach.

The applicants have also recognized that, as electronic devices have become smaller and more portable, the ability or inclination of electronic device manufacturers to include a specialized feature such as the Kensington security slot on the case has decreased, and for those devices lacking the slot, the slot-engaging lock elements cannot effectively and securely engage the case of the electronic device.

The applicants have thus recognized that a need exists for a security device that is able to be affixed to electronic devices without any special provision (such as the Kensington security slot) made in the case of the electronic device for interfacing a security device. Consequently, no special structure may need to be formed in the case of the electronic device in order to engage the security device. The applicants have also recognized that it would be highly advantageous if the security device was able to interface with lock elements of existing security devices, such as those devices which are designed to engage a Kensington security slot, and in this way users may be able to continue to utilize their previously purchased security devices with new electronic devices having cases that lack a specialized interface such as a slot.

The applicants have developed a security medallion which is able to be attached to the exterior surface of the case of an electronic device, and even those electronic devices with relatively small sized cases, in a manner which does not require a specialized mechanical interface to be integrated with the case at the time manufacture in order to securely attach the medallion to the case, which may be removed from the case of the electronic device by an authorized person at a later time in a manner that is not easily accomplished without specialized equipment and techniques, and which may permit the user to utilize lock elements which have been designed to engage a Kensington security slot. Thus, elements of the security medallion system may be secured to the case of the electronic device in the absence of any slot or special structure formed in the case, and may be effectively secured to relatively smooth surfaces of a case. Also, for example, a cable lock configured to interface with the Kensington security slot interface may be engaged with the security medallion while it is secured to the case of the electronic device so that functionally the cable lock is secured to the case even though the case lacks the slot.

Further, the security medallion may provide features and functionality in addition to the mechanical locking capability for securing electronic devices. For example, the security medallion may incorporate circuitry to provide smart locking functionality for securing the electronic device which is not possible with the traditional device securing systems, particularly those utilizing the Kensington security slot.

FIGS. 1-4 illustrate a security medallion 20 embodying the invention. The security medallion 20 is configured to attach to a portable object 24 (FIG. 19), such as a portable electronic device. In some embodiments, the portable object 24 may be, for example, a laptop or notebook computer, a tablet computer, a smartphone, a thin client, an eReader, an MP3 player, a USB hub, a chip and pin machine, or the like. The security medallion 20 is a relatively small, self-contained unit that provides both physical security and electronic security to the potable object 24. The illustrated security medallion 20 is round, but may alternatively be square, hexagonal, or any other desired shape. The security medallion 20 may also act as a label that provides product information or ownership information associated with the portable object 24. For example, a company or government agency logo can be incorporated into the medallion 20 (e.g., by laser etching, 3D printing, casting, molding, etc.) to clearly identify in a permanent nature the object being protected and its owner.

The illustrated security medallion 20 includes a housing 28, a slot 32, a circuit board 36, a power source 40, and an attachment member 44. In the illustrated embodiment, the housing 28 is generally cylindrical, but may alternatively be other shapes or configurations. The housing 28 is made of plastic or metal. In some embodiments, the housing 28 may have a diameter of about 3 to 4 inches, and may have a thickness of about 0.25 inches. In other embodiments, the housing 28 may have different diameters and/or thicknesses, depending on the components included within the housing 28. The illustrated housing 28 includes a cover 48 containing a logo, badge, or other identifying indicia of the owner or business associated with the security medallion 20. The cover 48 can be customized with different colors, words, logos, and the like for different users. In some embodiments, the cover 48 is made of metal to also function as an antenna for the security medallion 20.

Figure 19:
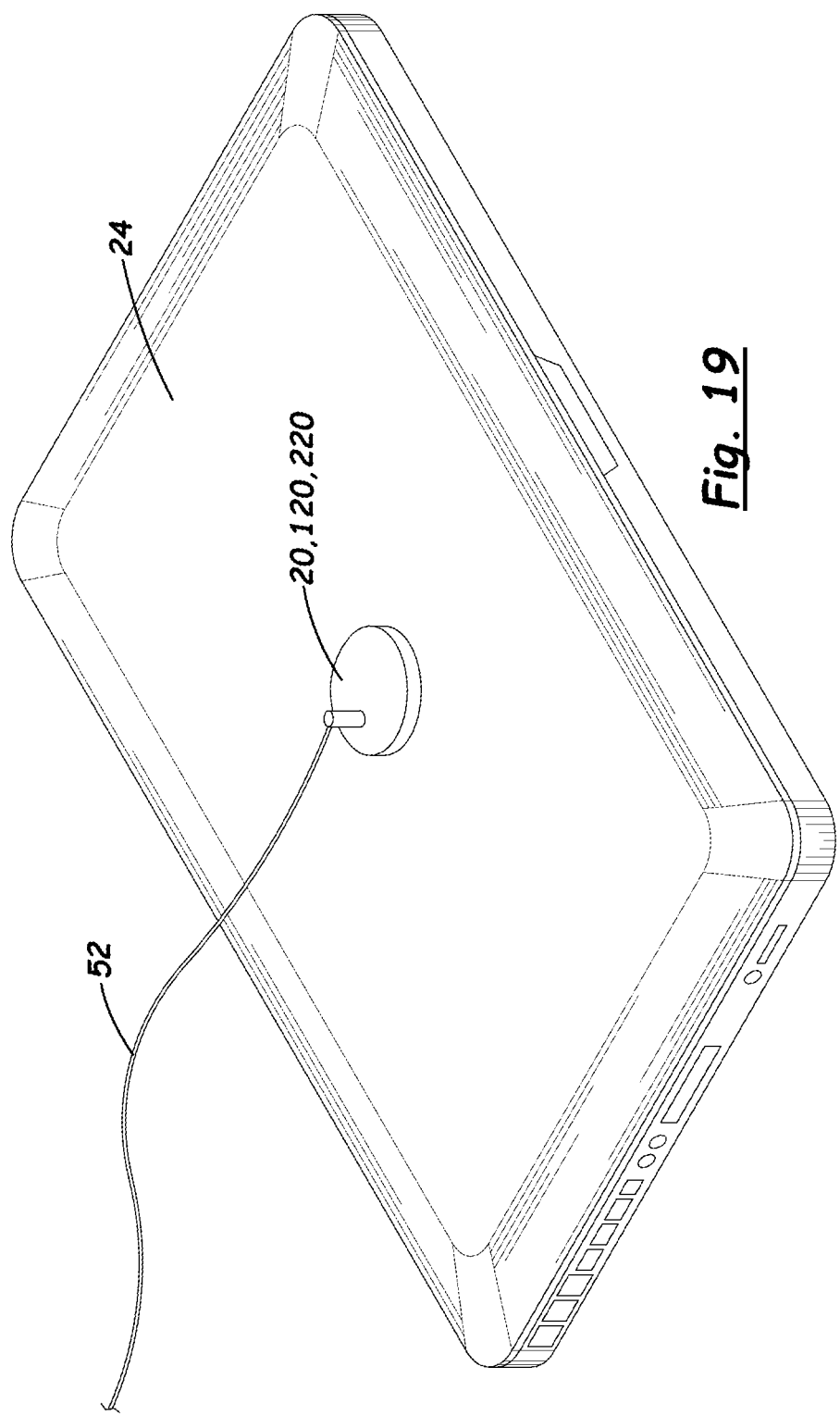
FIG. 19 illustrates a schematic security medallion attached to a portable object and secured with a laptop cable lock.
Figure 20:
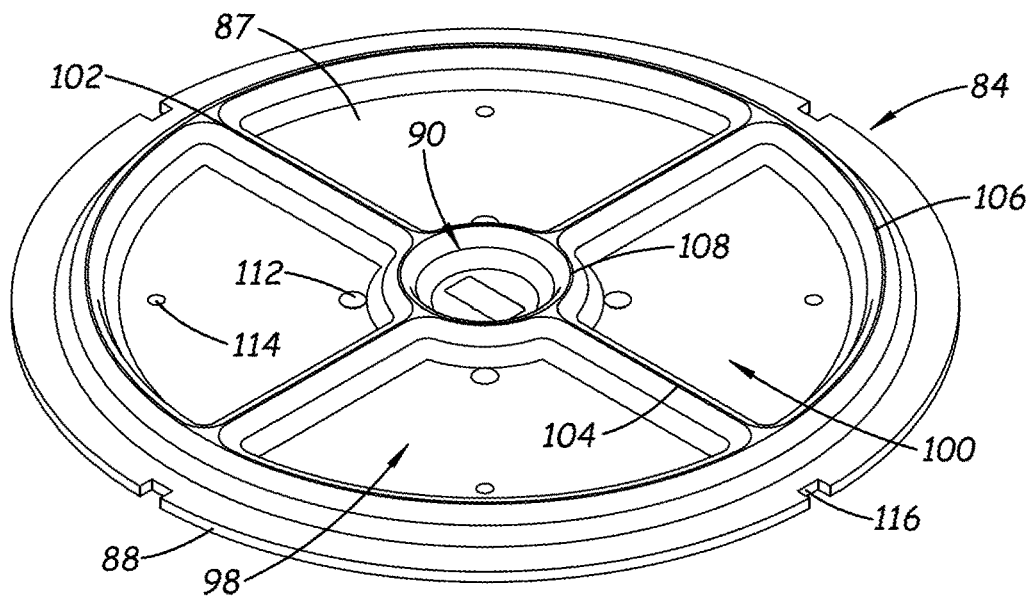
FIG. 20 is a schematic perspective view of the top of an attachment member of the security medallion, according to illustrative embodiments.
Figure 21:
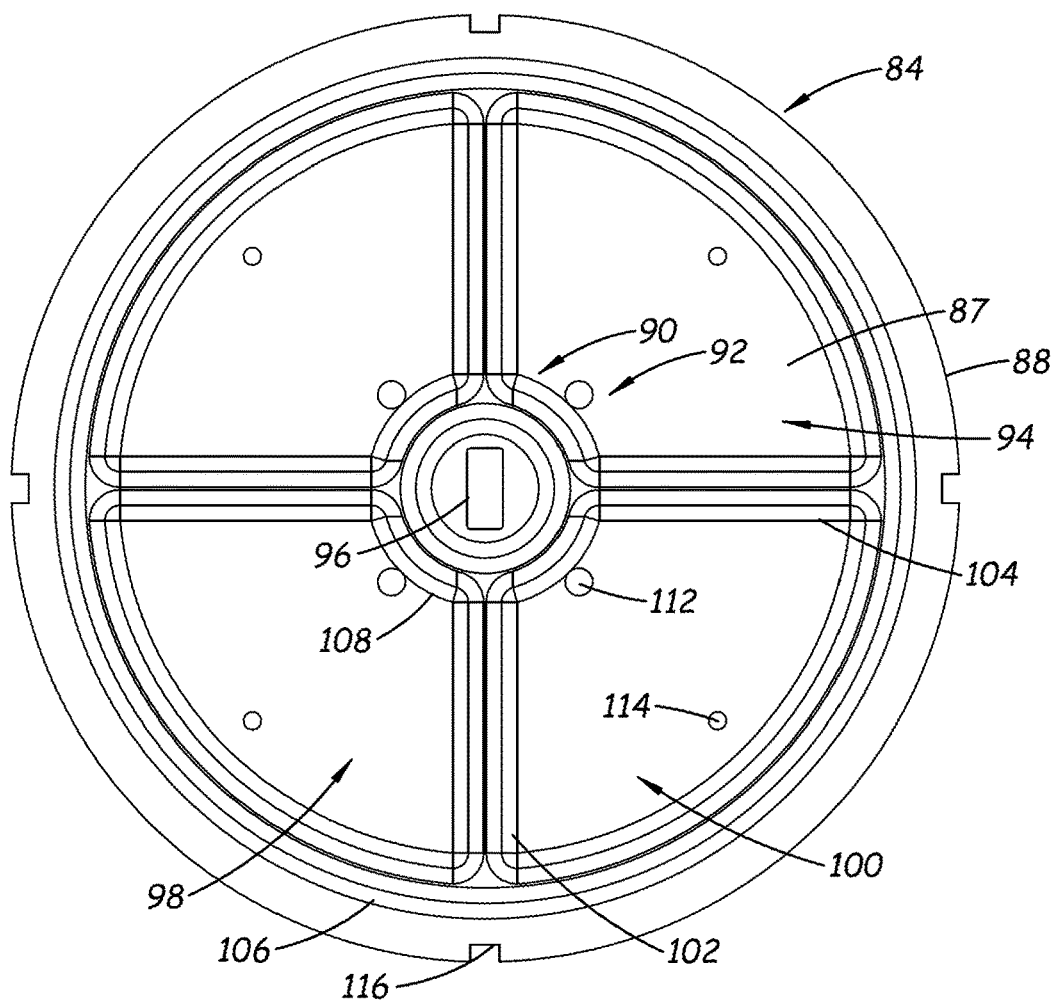
FIG. 21 is a schematic bottom view of the attachment member of the security medallion of FIG. 20, according to illustrative embodiments.
Figure 22:
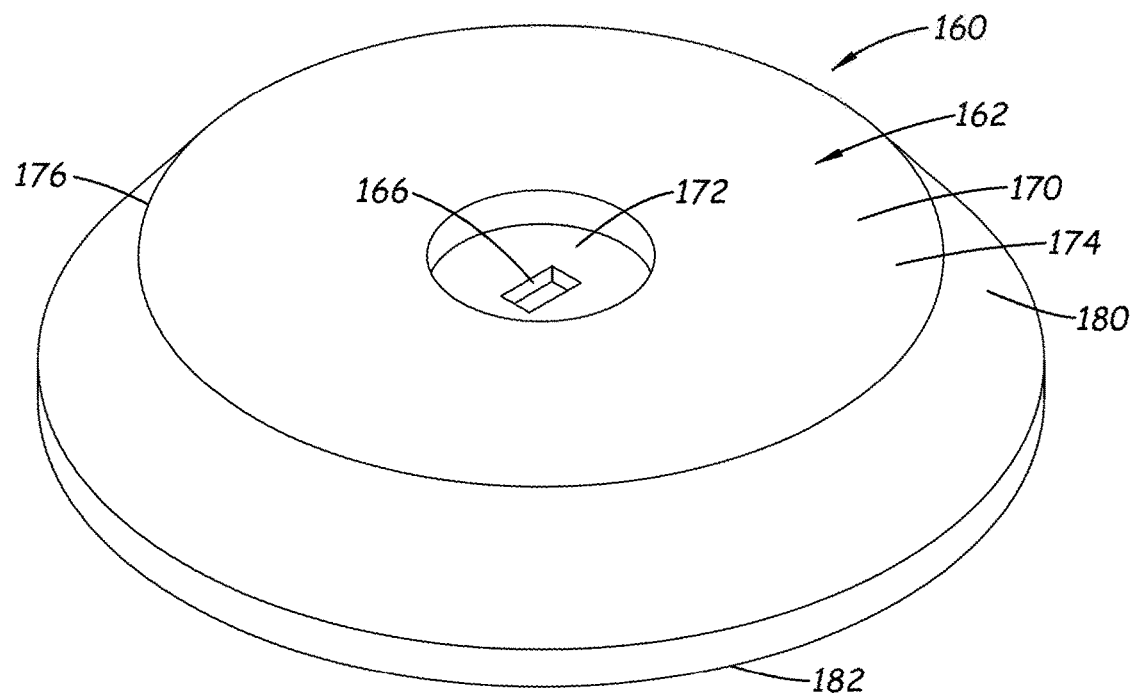
FIG. 22 is a schematic perspective view of the top of a cover member of the security medallion, according to illustrative embodiments.
Figure 23:
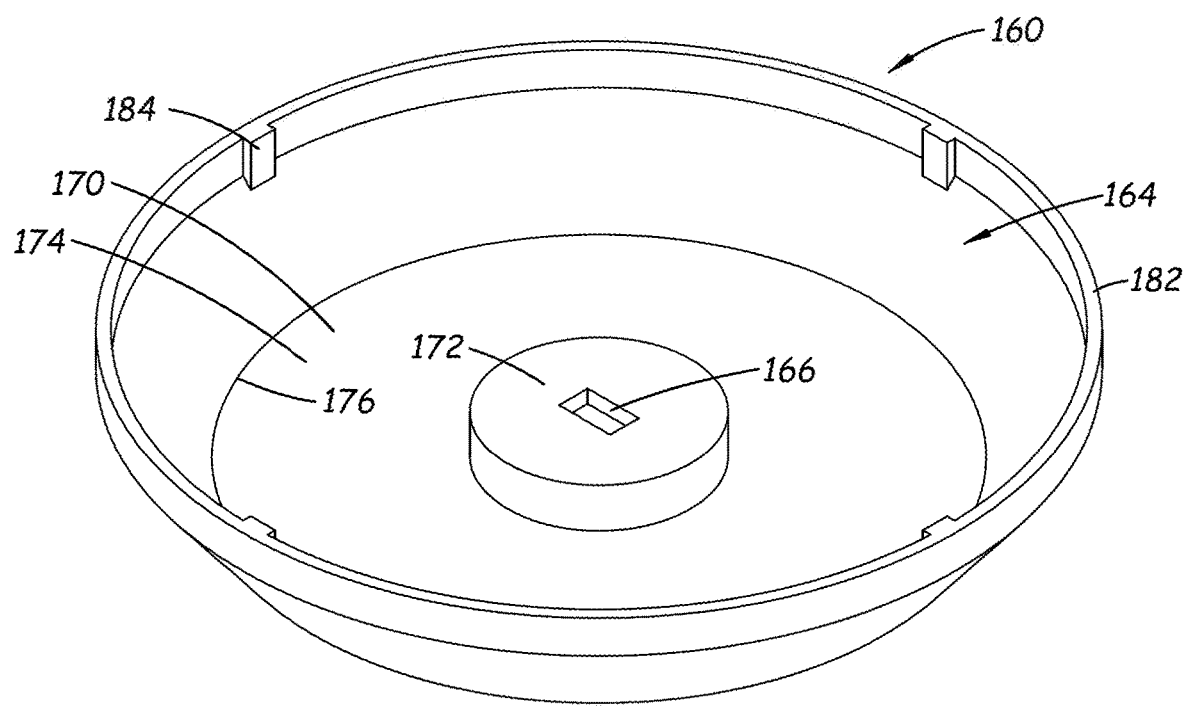
FIG. 23 is a schematic perspective view of the bottom of the cover member of the security medallion of FIG. 22, according to illustrative embodiments.
Figure 24:
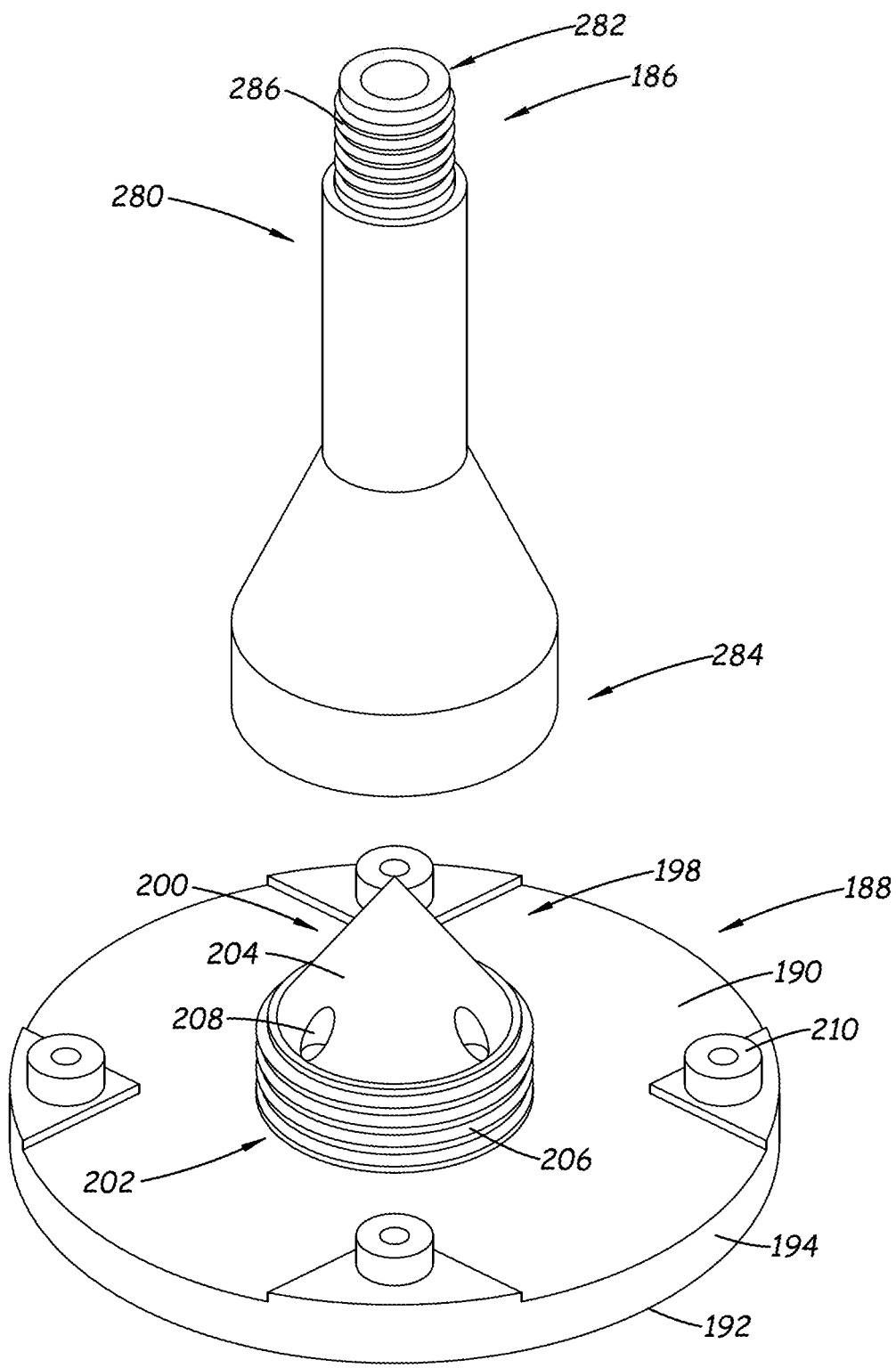
FIG. 24 is a schematic exploded perspective view of an applicator structure of the system, according to illustrative embodiments.
Figure 25:
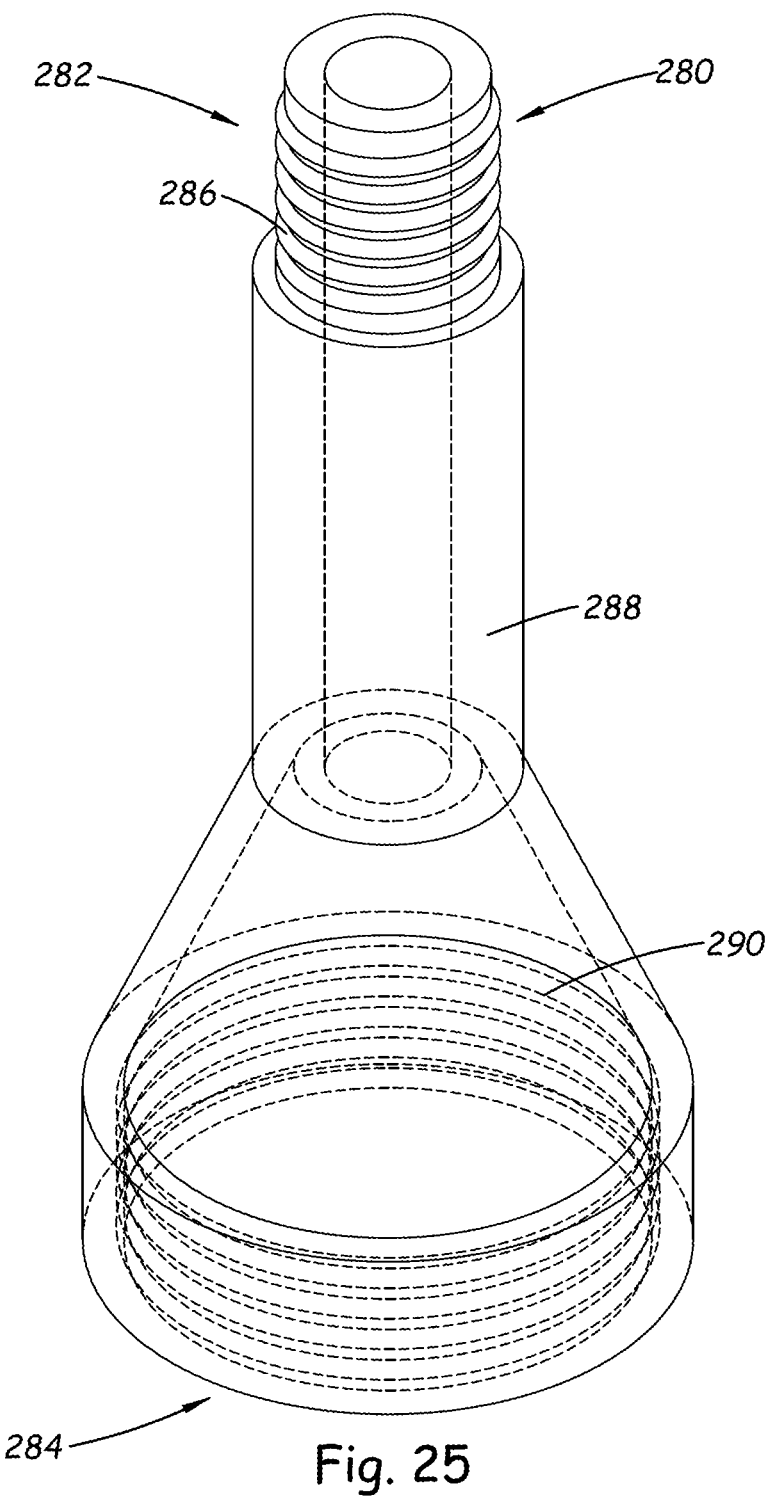
FIG. 25 is a schematic perspective view of the applicator adapter of the applicator structure of the system with features shown in phantom lines, according to illustrative embodiments.
Figure 26:
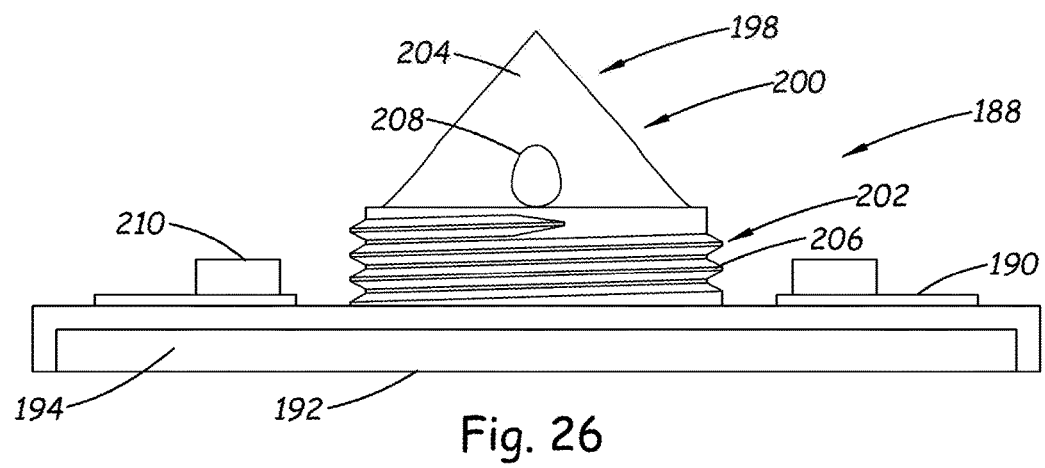
FIG. 26 is a schematic side view of an applicator disk of the applicator structure of the system shown in FIG. 24, according to illustrative embodiments.
Figure 27:
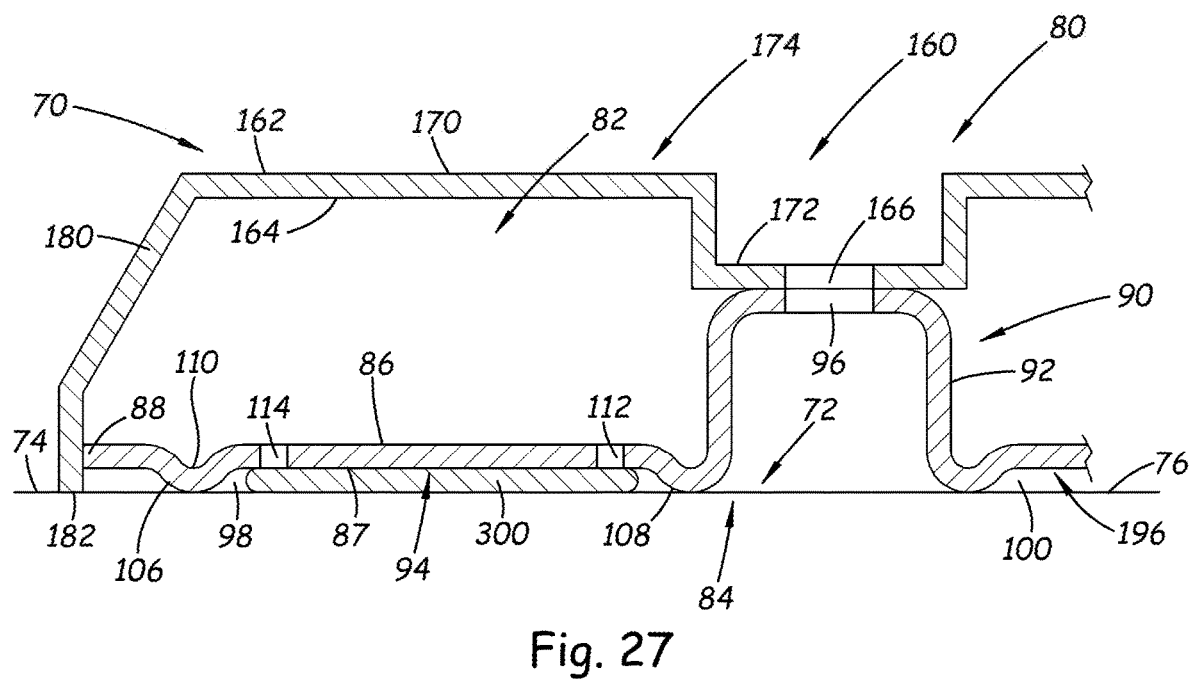
FIG. 27 is a schematic side sectional view of a portion of the attachment member and the cover member of the security medallion in an assembled condition, according to illustrative embodiments.

The slot 32 is formed in the housing 28. In particular, the slot 32 is formed in the cover 48 of the housing 28, but may alternatively be formed elsewhere on the housing 28. As shown in FIG. 19, the slot 32 is part of a mechanical interface configured to receive a physical lock 52, such as the laptop cable lock disclosed in U.S. Pat. No. 5,381,685. The cable lock could have a T-bar or scissor mechanism. The physical lock 52 secures the security medallion 20 (and, thereby, the attached portable object 24) to an immovable object, such as a desk, table, chair, or the like. The security medallion 20 thereby provides a security slot for a conventional cable lock on any type of device or object, particularly newer, slim portable electronic devices that do not contain a similar type of slot or security interface.

Referring back to FIGS. 2 and 4, the circuit board 36 is positioned within the housing 28. In some embodiments, the circuit board 36 is a printed circuit board (PCB) including a processor and a memory. The circuit board 36 includes electronics that are operable to provide electronic security for the portable object 24. For example, the circuit board 36 may include one or more of the following components: (i) an RFID tag for monitoring and maintaining inventory records and/or security clearance/level authorizations; (ii) a transceiver (e.g., low energy Bluetooth®) for transmitting authentication information, alarm information, and/or monitoring information to a remote device (e.g., a user's smartphone, a server, etc.); (iii) a wireless chipset (e.g., WiFi, near-field communications, etc.) to provide alarm notifications when the security medallion 20 is moved, altered, or accessed improperly; (iv) an accelerometer for detecting and reporting movement of the security medallion 20; (v) a GPS chipset to determine the location of the security medallion 20; and (vi) an active RF tag to track movements of the security medallion 20 within a facility. In some embodiments, the circuit board 36 may also electrically couple to the portable object 24. In such embodiments, the circuit board 36 may, when triggered by an event (e.g., unauthorized movement, a command from a remote device. etc.), selectively erase critical data from the portable object 24. In addition, the security medallion 20 could track the location of the portable object 24 via the Internet and the portable object's IP address.

The power source 40 is also positioned within the housing 28 and is coupled to the circuit board 36. The power source 40 provides power to the electronics of the security medallion 20. In some embodiments, the power source 40 may include one or more rechargeable batteries, such as Li-ion batteries. A charging port (e.g., a micro-USB port) may be supported by the housing 28 and coupled to the circuit board 36 to recharge the power source 40. Alternatively, the power source 40 may be recharged wirelessly (e.g., by induction charging). In some embodiments, the security medallion 20 may include LEDs (or other types of displays) coupled to the power source 40 and supported on the housing 28 to indicate statuses associated with the security medallion 20 (e.g., armed, low battery, charging, security violations, etc.).

The attachment member 44 is supported by the housing 28. Together with the housing 28, the attachment member 44 encloses the circuit board 36 and the power source 40. The attachment member 44 is configured to selectively secure the security medallion 20 to the portable object 24 (FIG. 19). The attachment member 44 is also removable from the portable object 24 without damaging or marring the portable object 24. In some embodiments, the attachment member 44 includes an adhesive 56 that bonds to an outer surface of the portable object 24. The adhesive 56 affixes the security medallion 20 to the portable object 24 quickly, but cannot be removed easily or rapidly. As such, the security medallion 20 provides security to the portable object 24 by ensuring that the medallion 20 (and the physical lock 52, if present) remains an integral part of the portable object 24 until the adhesive 56 is released by an authorized user.

Figure 18:
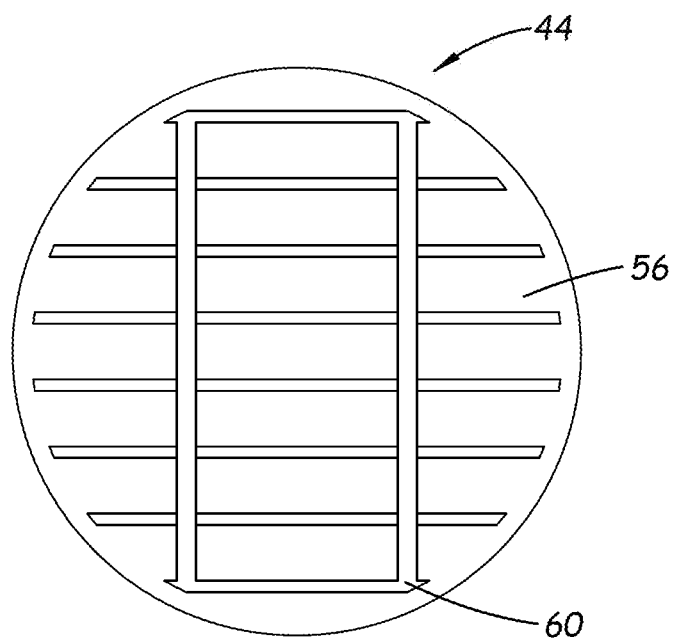
FIG. 18 illustrates a schematic attachment member for use with a security medallion.

In the illustrated embodiment, the adhesive 56 is releasable from the portable object 24 by introducing an electrical current into the adhesive 56. As shown in FIG. 18, a grid of wires 60 extends through the attachment member 44 and, more particularly, the adhesive 56. The grid of wires 60 is electrically coupled to the power source 40. Introducing an electrical current at a specific magnitude and/or frequency into the grid of wires 60 causes the adhesive 56 to heat to a specific temperature, thereby releasing the adhesive 56.

In other embodiments, the adhesive 56 is releasable from the portable object 24 electrically, electronically, through introduction of light at specific frequencies, through introduction of audio energy or sound at specific frequencies, through introduction of micro bubbles, through introduction of a chemical, and/or through introduction of radio waves, microwaves, ultrasound waves, or infrared waves. In further embodiments, the adhesive 56 is releasable using a magnetic field, an electrical field, or a radio frequency energy field.

In some embodiments, the power source 40 may provide the electrical current to the attachment member 44 in response to a code or a signal. For example, the security medallion 20 may include a security feature (e.g., a keypad, a lock cylinder, a biometric reader, etc.) on the housing 28. When the security feature is activated, the security feature may signal the circuit board 36 to activate the power source 40 and release the attachment member 44 from the portable object 24. Additionally or alternatively, the circuit board 36 may receive a wireless signal from a fob, a smartphone, or other device to activate the power source 40 and supply electrical current to the grid of wires 60, releasing the attachment member 44 from the portable object 24. If the attachment member 44 is removed from the portable object 24 without the proper code or signal, the security medallion 20 may trigger a remote or local alarm, and/or the portable object 24 may be damaged.

The security medallion 20 is designed to involve a delay before removing the adhesive 56 from the portable object 24. Unless the adhesive 56 is released in a predetermined manner, there may be extensive damage to the portable object 24, or the security medallion 20 may simply not be removable. The methods of authorized removal of the security medallion 20 may rely on a variety of inputs, including temperature increase or decrease, electrical signal, electronic signal, radio frequency energy, sound, light, infrared, ultraviolet, or other code or means as an input to make removal relatively easy and timely without damage or trace to the portable object 24.

FIGS. 5-8 illustrate another security medallion 120 embodying the invention. The illustrated security medallion 120 is similar to the security medallion 20 shown in FIGS. 1-4, and includes a housing 128, a slot 132, a circuit board 136, a power source 140, and an attachment member 144. In the illustrated embodiment, the housing 128 includes an outer ring 148 in addition to a cover 152. The outer ring 148 is rotatable 360 degrees relative to the cover 152. The slot 132 is formed in the outer ring 148 to connect the physical lock 52 (FIG. 19) to a perimeter of the security medallion 120. The slot 132 and, thereby, the physical lock 52 can be adjusted to any position relative to the portable object 24 by rotating the outer ring 148.

FIGS. 9-16 illustrate yet another security medallion 220 embodying the invention. In the illustrated embodiment, the security medallion 220 is a two-piece medallion, including a dock 224 (FIGS. 9-11) and a body 228 (FIGS. 12-13) that attaches to the dock 224. The two-piece arrangement allows the body 228 to be removed from and reattached to the portable object 24 (FIG. 19) without also having to remove the dock 224. The dock 224 can be permanently or releasably secured to the portable object 24.

Figure 9:
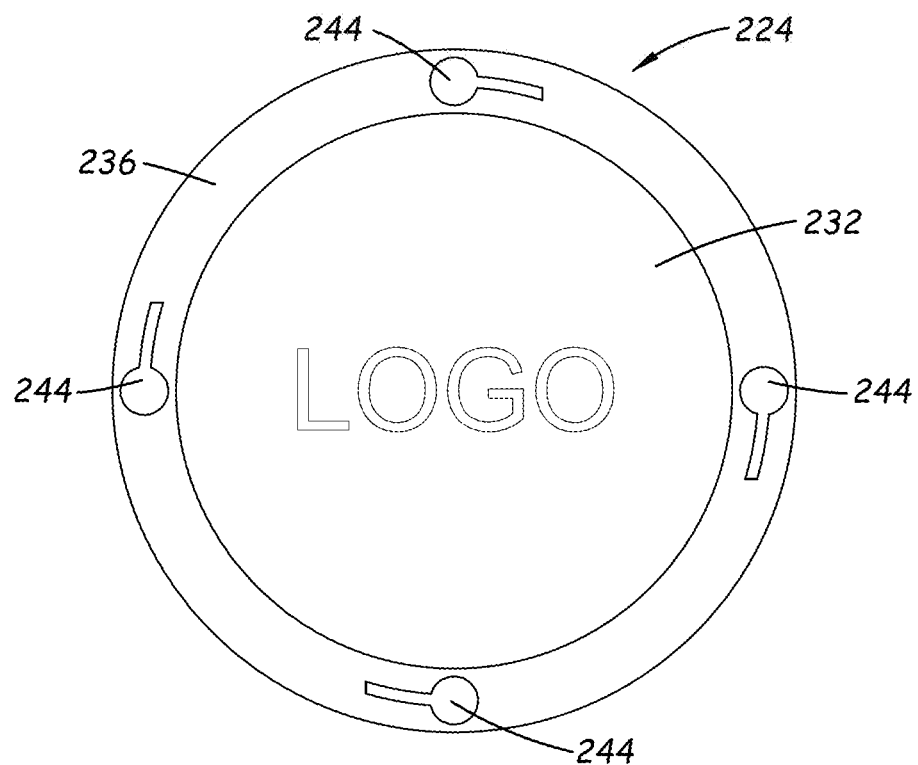
FIG. 9 is a schematic top view of a security medallion dock embodying the invention.
Figure 10:
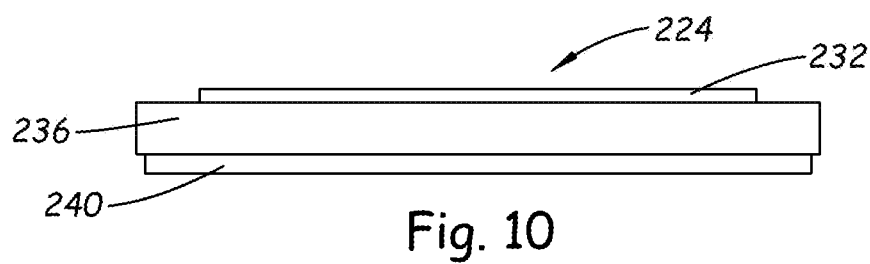
FIG. 10 is a schematic side view of the security medallion dock of FIG. 9.
Figure 11:
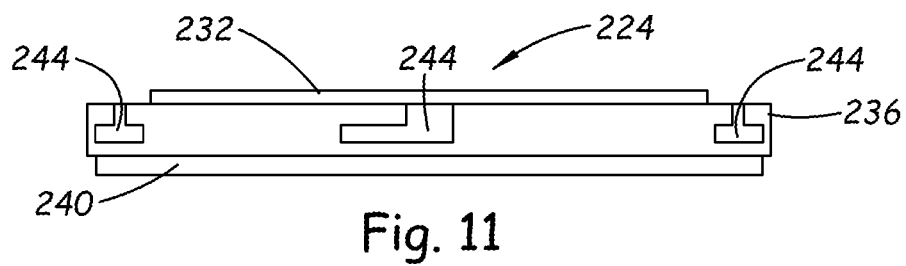
FIG. 11 is a schematic side, partial cross-sectional view of the security medallion dock of FIG. 9.

As shown in FIGS. 9-11, the illustrated dock 224, or mount, includes a plate 232, an outer ring 236, and an attachment member 240. The plate 232 contains a logo, badge, or other identifying indicia of the owner or business associated with the security medallion 220. The outer ring 236 surrounds a perimeter of the plate 232 and defines a plurality of slots 244. In the illustrated embodiment, the outer ring 236 includes four slots 244 that are evenly spaced around the ring 236, and the slots 244 are generally keyhole-shaped. In other embodiments, the outer ring 236 may include fewer or more slots 244. The attachment member 240 is supported underneath the plate 232. The attachment member 240 may be similar to the attachment member 44 discussed above with respect to FIGS. 1-4. Alternatively, the attachment member 240 may include an adhesive or other mechanism that permanently (i.e., non-removably) attaches the dock 224 to the portable object 24.

Figure 12:
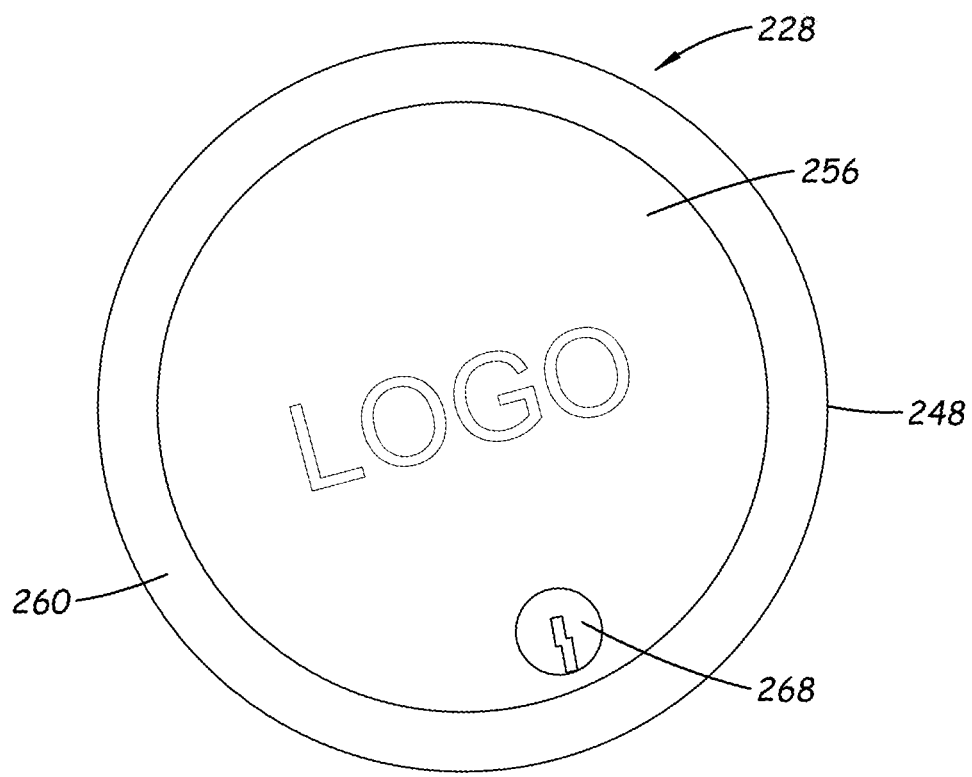
FIG. 12 is a schematic top view of a security medallion body that interfaces with the security medallion dock shown in FIG. 9.
Figure 13:
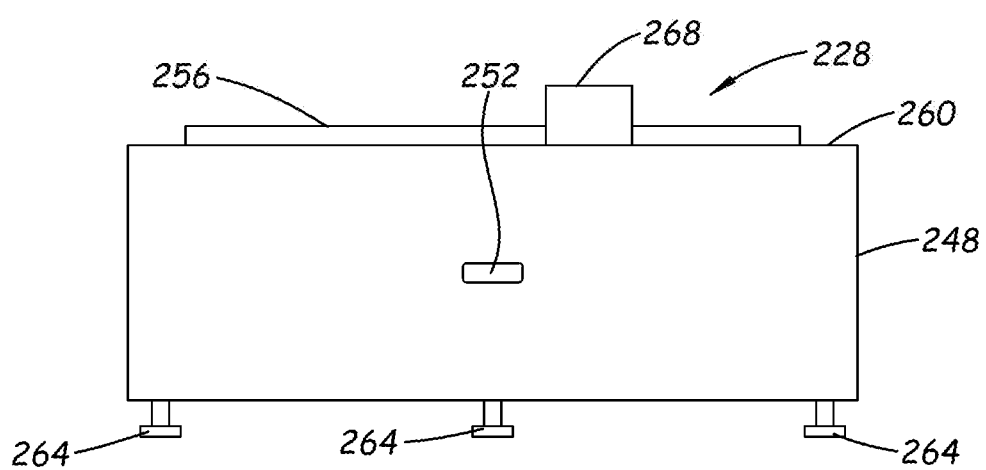
FIG. 13 is a schematic side view of the security medallion body of FIG. 12.

As shown in FIGS. 12-13, the body 228 includes a housing 248 and a slot 252 formed on the housing 248. The housing 248 includes a cover 256 and an outer ring 260. The cover 256 contains a logo, badge, or other identifying indicia of the owner or business associated with the security medallion 220. The outer ring 260 surrounds a perimeter of the cover 256. The outer ring 260 is rotatable 360 degrees relative to the cover 256. The slot 252 is formed in the outer ring 260 and is configured to receive the physical lock 52 (FIG. 19). The slot 252, and thereby the physical lock 52, can be adjusted to any position relative to the portable object 24 by rotating the outer ring 260.

Although not shown, the body 228 also includes a circuit board and a power source positioned within the housing 248, similar to the circuit board 36 and the power source 40 discussed above with respect to FIGS. 1-4.

The illustrated body 228 further includes a plurality of posts 264 and a lock mechanism 268. The posts 264 are receivable in the slots 244 (FIG. 9) of the dock 224 to connect the body 228 to the dock 224. In the illustrated embodiment, the body 228 includes four posts 264 extending downwardly from the body 228. In other embodiments, the body 228 may include fewer or more posts 264, matching the number of slots 244 in the dock 224. The lock mechanism 268 is supported by the housing 248. The lock mechanism 268 is operable to selectively inhibit movement of the body 228 relative to the dock 224, as further explained below. In the illustrated embodiment, the lock mechanism 268 is actuatable by a key. In other embodiments, the lock mechanism 268 may be actuated by a combination, a code, a wireless signal, or the like.

Figure 14:
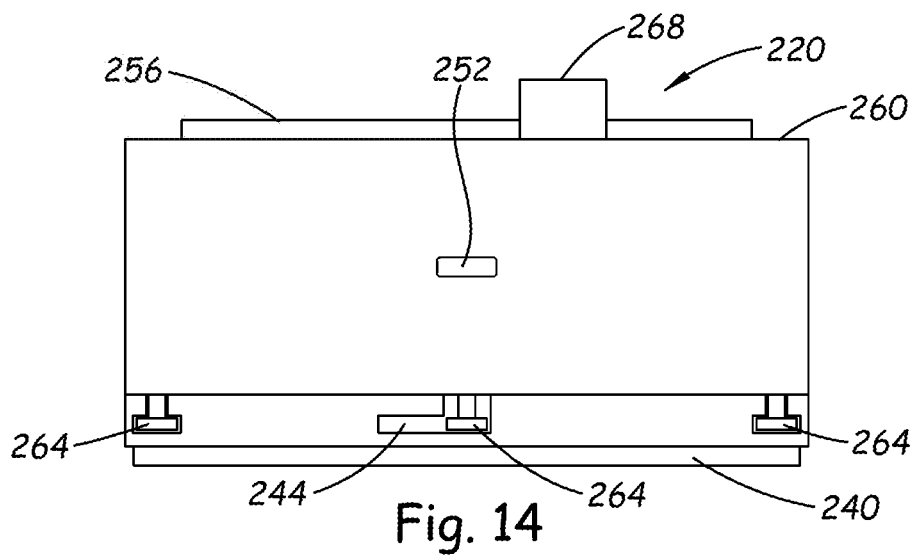
FIGS. 14 through 16 are schematic side, partial cross-sectional views of the security medallion body of FIG. 12 connecting to the security medallion dock of FIG. 9.
Figure 15:
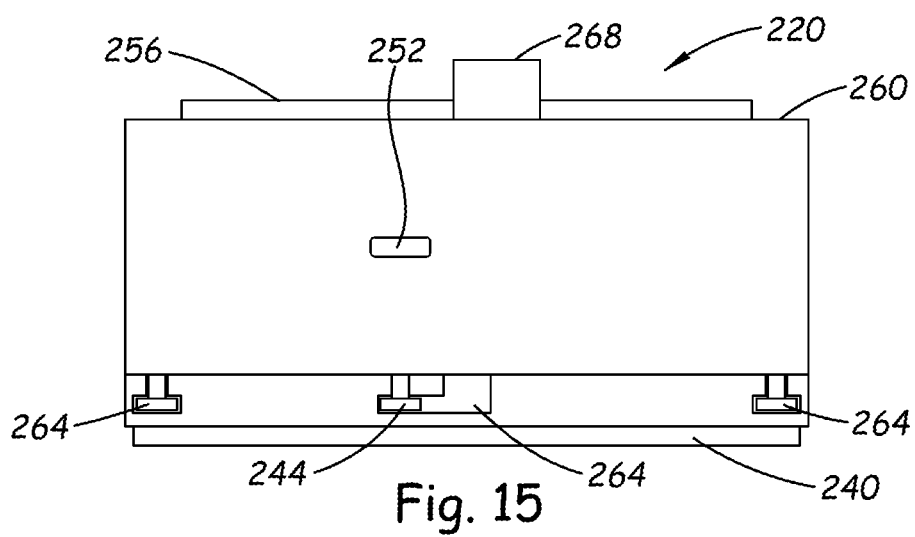
Figure 16:
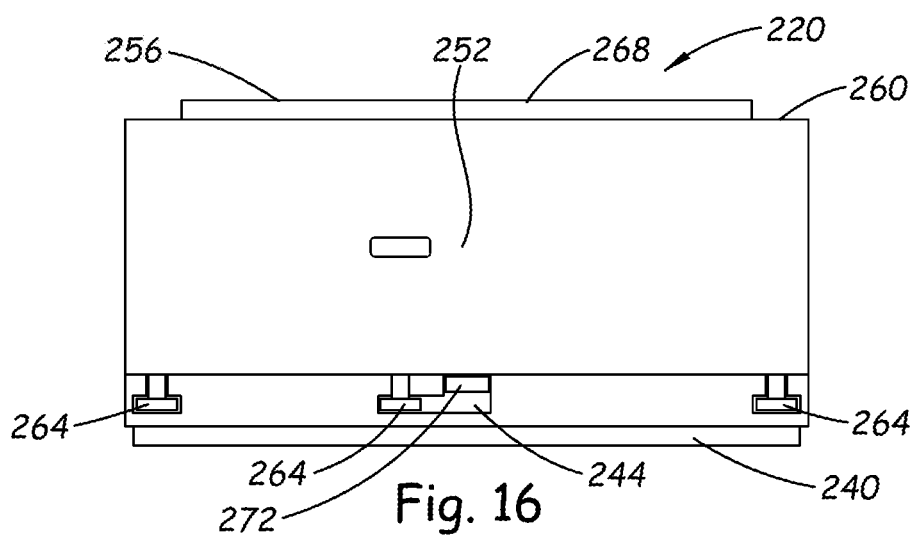
Figure 17:
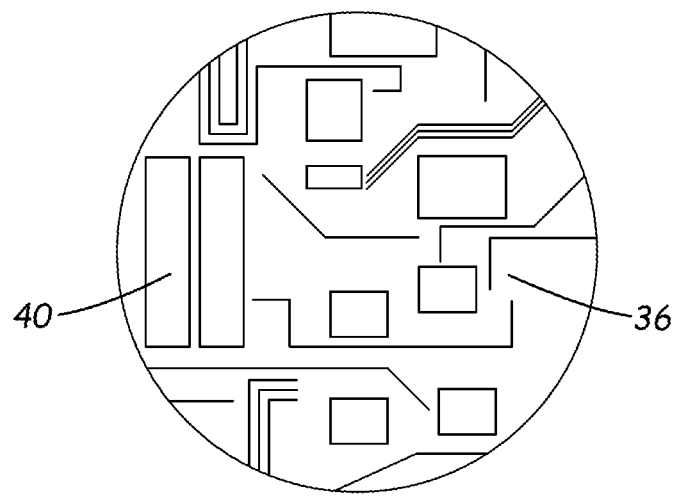
FIG. 17 illustrates a schematic printed circuit board for use with a security medallion.

FIGS. 14-16 illustrate the body 228 being attached to the dock 224. In FIG. 14, the posts 264 of the body 228 are inserted into the slots 244 of the dock 224. In this position, the body 228 and the dock 224 are aligned, but not secured together. In FIG. 15, the body 228 is rotated relative to the dock 224 so that the posts 264 slide to narrow sections of the slots 244 (similar to a bayonet-style connection). In this position, the body 228 is secured relative to the dock 224 (i.e., the body 228 cannot be pulled axial pin ly away from the dock 224), but is not locked to the dock 224. In FIG. 16, the lock mechanism 268 is actuated to inhibit movement (e.g., rotation) of the body 228 relative to the dock 224. In particular, the lock mechanism 268 is actuated so a projection 272 extends from the housing 248 of the body 228 into one of the slots 244. The projection 272 fills space within the slot 244, inhibiting the body 228 from being rotated back to the position shown in FIG. 14. In the position of FIG. 16, the body 228 is locked to the dock 224.

In additional embodiments of the disclosure, such as are shown in FIGS. 20 through 27 of the drawings, a security medallion system 70 may include an electronic device 72, which may comprise a device such as a portable laptop computer or others identified in this disclosure, and may have a case 74 which houses and encapsulates substantially an entirety of the elements of the electronic device. At least a portion of the case 74 may have an exterior surface 76, and at least a section of the exterior surface may be suitable for attachment of the medallion assembly 80, and may be, for example, substantially smooth and substantially planar and continuous without significant interruption.

The medallion system 70 may also include a medallion assembly 80 which is configured to be secured to an electronic device, and more specifically to the exterior surface of the case of a device 72. The medallion assembly 80 may be configured to secure to the section of the exterior surface having characteristics suitable to facilitate a suitable bond with the case. The medallion assembly 80 may define an interior 82 which may contain various elements of the medallion, such as electronic circuitry. It will be recognized that the interior 82 may contain any of the components relating to the functionality of the medallion, such as circuit boards, circuitry, and the like that are described in or suggested by this disclosure.

The medallion assembly 80 may include an attachment member 84 which is configured to mount on the case 74 of the electronic device. The attachment member 84 may have a first face 86 and a second face 87, with the first face being oriented toward the interior 82 of the medallion assembly 80 and the second face being oriented toward the case of the electronic device when the medallion assembly is applied to the device. In some embodiments, the attachment member 84 may comprise an attachment plate formed from a sheet of strong, resilient material such as a metal. The plate of the attachment member may have a peripheral edge 88 which extends between the first 86 and second 87 faces of the member, and illustratively the edge 88 may be circular in shape, although other peripheral shapes could be utilized.

The attachment member 84 may have a center 90 which is located centrally with respect to the peripheral edge 88, and a central portion 92 of the member 84 may be generally located at the center 90 of the attachment member. A peripheral portion 94 of the attachment member may be positioned between the central portion 92 and the peripheral edge 88. In some embodiments, the central portion 92 may be raised with respect to the peripheral portion 94 such that the central portion protrudes with respect to a plane generally defined by the extent of the peripheral portion. A locking aperture 96 may extend into the attachment member 84, and may extend through the attachment plate of the member 84, and may be located on the central portion 92 of the attachment member. In many highly preferred embodiments of the disclosure, the locking aperture 96 as well as the central portion 92 of the attachment member may be configured to standards set forth by Kensington Computer Products Group for Kensington security slots formed directly in the case of electronic devices so that lock elements that are compatible with Kensington security slots formed in electronic devices may also be interfaced effectively with the locking aperture 96 of the attachment member.

The attachment member 84 may define a plurality of chambers 98, 100 at the second face 87 of the member 84, and illustratively each of the chambers may radiate outwardly with respect to the center 90 of the member 84. In embodiments, each of the chambers 98, 100 may be separated from other adjacent chambers by a pair of chamber walls 102, 104, and may be further defined by a peripheral wall 106 extending between the chamber walls, and illustratively forming a circular shape. The chamber walls 102, 104 may radiate outwardly with respect to the center 90 of the attachment member 84, and the peripheral wall 106 may extend generally along or adjacent to the peripheral edge 88 of the member 84 at a location generally opposite of the center 90. The chamber walls and peripheral wall may extend or protrude outwardly from the second face 87, and may be oriented substantially perpendicular to the second face, to effectively offset the majority of the second face from the exterior surface 76 of the case of the electronic device when the member 84 is positioned adjacent to the case. Thus, the second face 87, the chamber walls 102, 104, the peripheral wall 106, and the exterior surface 76 of the case may collectively define the extents of each chamber. In some embodiments, a central wall 108 may be positioned toward the center 90 of the attachment member 84 and may extend about the center with each of the chamber walls 102, 104 extending outwardly from the central wall 108 to the peripheral wall 106. In the illustrative embodiments, the plurality of chambers comprises four chambers such that each chamber covers a quadrant of the second face 87. In embodiments in which the attachment member 84 is formed by a plate, the chamber walls and the peripheral wall (as well as the central wall) may be formed by the impression or stamping of a groove 110 into the first face 86 of the plate to thereby produce protruding wall elements on the second face 87 of the member 84.

The attachment member may have an injection hole 112 associated with each of the chambers 98, 100 of the member 84, and the injection hole 112 may extend through the member in a position which corresponds to the respective chamber. Additionally, a vent hole 114 may be associated with each of the chambers of the member 84, and may extend through the member in a position which also corresponds to the respective chamber. The vent hole 114 for a chamber may be spaced from the injection hole 112 for the same chamber, and the injection hole may be located relatively closer to the center 90 of the attachment member and the vent hole may be located relatively further from the center 90. Also, at least one alignment notch 116 may be formed in the peripheral edge 88 of the attachment plate.

The medallion assembly 60 may also include a cover member 160 which is configured to removably mount on the attachment member 84 to further define the interior of the medallion assembly and may provide a more aesthetically pleasing appearance for the assembly 80 than the attachment member 84 alone. To that purpose, the cover member 160 may be configured to hide the attachment member 80 from view when the cover member is mounted on the attachment member. In greater detail, the cover member 160 may have an outer side 162 and an inner side 164, and the inner side may be oriented toward the attachment member 84 when the cover member is mounted on the attachment member while the outer side may be oriented away from the attachment member. The outer side 162 may be generally convex in shape while the inner side 164 may be generally concave in shape such that the attachment member may be substantially entirely positionable in the cover member on the inner side when the cover member is mounted on the attachment member. The cover member 160 may define an access aperture 166 which may be alignable with the locking aperture 96 formed in the attachment member when the cover member is mounted on the attachment member so that locking elements inserted through the access aperture 166 are able to pass into the locking aperture 96 and be engaged with the attachment member. The presence of lock elements engaging the aperture 166 and aperture 96 may effectively further secure the cover to the attachment member against removal.

The cover member 160 may include a main wall portion 170 which may extend in an orientation substantially parallel to the attachment member 84 when the cover member is mounted on the member 84. The main wall portion 170 may have a central region 172 and a boundary region 174 which extends about the central region, and the boundary region may terminate at an outer boundary 176. The access aperture 166 may be located on the central region 172, and the central region may be depressed with respect to the boundary region in order to position the central region of the cover member closely adjacent to the protruding central portion 92 of the attachment member to facilitate alignment of the access aperture 166 and a locking aperture 96. In addition to the main wall portion 170, the cover member may also include a skirt wall portion 180 which extends from the main wall portion, such as from the outer boundary 176. The skirt wall portion 180 may be oriented generally perpendicular to the major plane of the main wall portion, and in some embodiments may form a frusta-conical shape with the main wall portion. The skirt wall portion 180 may have a lower edge 182 at which the wall portion 180 terminates opposite of the main wall portion. At least one alignment tab 184 may be provided which is removably positionable in one of the alignment notches 116 of the attachment member 84. The alignment tab may have a mounting notch formed therein for engaging a portion of the peripheral edge 88 of the attachment member located in the alignment notch.

The system 70 may also include elements useful in the mounting of the medallion assembly 80, and more particularly the attachment member 84, to the exterior surface 76 of the device. These elements may include, for example, an applicator structure 186 which is configured to facilitate application of an adhesive or adhesive material to the attachment member to the device. In particular, the applicator structure 186 may guide movement of a flowable adhesive material into the plurality of chambers of the attachment member where the adhesive material may assume a non-flowable condition, such as through cooling of the adhesive material or other process which hardens the adhesive material. In the illustrative embodiments, the applicator structure 186 may comprise an applicator disk 188 which is configured to be positioned adjacent to the attachment member, such as when the attachment member is positioned adjacent to the exterior surface of the case of the device and is to be adhered to the case. The applicator disk 188 may have a top surface 190 and a bottom surface 192 as well as a perimeter edge 194 which extends between the top and bottom surfaces of the desk. The perimeter edge 194 may be substantially circular, although other shapes may be utilized. In some embodiments, a void 196 may be formed on the bottom surface 192 of the discs for receiving at least a portion of the attachment member 84 when attachment or adhering is to be performed.

The top surface 190 of the disk 188 may have an interfacing protrusion 198 which extends from the mostly planar top surface and may serve as a guide for the application adapter 280 discussed herein. The interfacing protrusion 198 may be located substantially centrally on the applicator disk with respect to the perimeter edge 194 of the disk, and the interfacing protrusion may have a top portion 200 and a bottom portion 202. The top portion 200 may have a conically shaped surface 204 which may assist in the guiding of the flow of adhesive and the bottom portion may have a substantially cylindrical shape with exterior threads 206 formed thereon. The interfacing protrusion may form a space adjacent to the bottom surface which is able to accept the raised central portion 92 of the attachment member.

The applicator disk 188 may also include at least one injection passage 208 which may be alignable with one of the injection holes 112 associated with one of the chambers 98, 100 defined by the attachment member when the applicator disk is positioned adjacent to the attachment member so that the injection passage is in communication with the injection hole and adhesive flowing through the injection passage is able to enter the injection hole and reach the chamber. In some embodiments, the injection passage or passages 208 may be positioned on the interfacing protrusion 198 of the disk. Additionally, the applicator disk 188 may also include at least one vent passage 210 which may be alignable, or at least in communication with, one of the vent holes 114 of the attachment member when the applicator disk is positioned adjacent to the attachment member so that gases, such as air, pushed out of the chamber and through the vent hole 114 by the injected adhesive, is able to escape to the atmosphere through the vent passage 210.

The applicator structure 186 may also include an applicator adapter 280 which is configured to mount on the applicator disk 188 to carry flowing adhesive to the applicator disk 188 from an adhesive dispenser device, such as, for example, a glue gun. The applicator adapter 280 may have an upper end 282 and a lower end 284, and the upper end may be configured to connect to the adhesive dispenser device to transfer adhesive under pressure to the applicator structure, and the lower end of the applicator adapter may also be configured to connect to the applicator disk 188 to transfer flowable adhesive urged through the applicator adapter. The upper end 282 may have structure formed thereon for being engaged by the adhesive dispenser device, and illustratively may have exterior threads 286 formed thereon which not only mount the elements together but also seal the connection therebetween. A channel 288 may extend between the upper 282 and lower 284 ends of the adapter 280, and may be configured so that the channel is in communication with the one or more injection passages 208 of the applicator disk when the adapter 280 is mounted on the applicator disk. A portion of the channel 288 generally positioned adjacent to the lower end 284 of the adapter 280 may have interior threads 290 formed thereon for engaging the exterior threads 206 on the protrusion 198 of the disk 188. The applicator adapter 280 may have an upper portion 292 located adjacent to the upper end 282 and a lower portion 294 located adjacent to the lower end 284, and the width of the adapter 280, as well as the channel 288, may be greater in the lower portion 294 than the upper portion 292. The section of the channel 288 corresponding to the lower portion 294 may open more widely to accept at least a portion of the interfacing protrusion 198 and the conically shaped surface 204 on the top portion 200 of the protrusion 198.

Illustratively, the adhesive 300 utilized to adhere the attachment member to the case of the electronic device may flow at a high temperature and bonds to a surface as the adhesive cools. Once cooled after a period of time, such as few minutes, the bond formed between the attachment member and the exterior surface of the case should be sufficiently strong so that the attachment member cannot be easily or casually removed from the case by utilizing physical force which, for example, can be applied by the hands of a person without drawing attention to the activity. A sufficient bond may also resist removal in a manner such that attempts to remove the attachment member from the surface of the case without the suitable application of heat to the adhesive (e.g., via the attachment member) is likely to result in damage to the case of the electronic device and perhaps destruction of the device. Suitable adhesives may include hot melt adhesives and may have a melting range of approximately 350 degrees F. to approximately 385 degrees F. which permits the adhesive to flow as well as to release a bond to a surface. An illustrative example of a suitable adhesive is available under the trade designation 3747 from 3M Corporation of St. Paul, Minn.

A specialized tool may be utilized to remove the medallion assembly 80, and specifically the attachment member 84, from the exterior surface of the case of the electronic device without damaging or defacing the exterior surface of the case. More specifically, the tool may apply or otherwise transfer heat to the attachment member 84 defining the chambers 98, 100 containing the adhesive material, and thereby to the adhesive material located in the chambers that binds the attachment member to the exterior surface of the case. The heating of the adhesive material via this removal tool may cause the adhesive to release the bond between the adhesive material to the attachment member 84 and/or the case of electronic device.

A suitable and illustrative material for forming the attachment member is a metal, such as an aluminum composition such as is designated 6061. A suitable and illustrative material for forming the cover member is a plastic or thermoplastic material, such as polyoxymethylene, also known as acetal, which may have characteristics such as high tensile strength, creep resistance, high heat resistance, abrasion resistance and water resistance. Materials other than those specifically mentioned here may also be suitable for forming the cover and attachment member.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

What is claimed is:

1. A medallion assembly configured to be secured to an exterior surface of an electronic device, the medallion assembly comprising:
    an attachment member configured to mount on a case of the electronic device, the attachment member having a first face and a second face for orienting toward the case of the electronic device, a locking aperture extending into the attachment member from the first face, the attachment member defining a plurality of chambers defined on the second face, each of the chambers radiating outwardly with respect to a center of the attachment member, an injection hole being associated with each of the chambers, the injection hole for each chamber extending through the attachment member between the first and second faces at a position corresponding to a respective chamber of the plurality of chambers; and
    a cover member configured to removably mount on the attachment member, the cover member having an outer side and an inner side being oriented toward the attachment member when the cover member is mounted on the attachment member, the cover member defining an access aperture alignable with the locking aperture in the attachment member when the cover member is mounted on the attachment member.

2. The assembly of claim 1 wherein each of the chambers is separated from at least one adjacent said chamber, each of the chambers being defined by a pair of chamber walls and a peripheral wall, each chamber wall radiating outwardly with respect to a center of the attachment member.

3. The assembly of claim 2 wherein each chamber wall and the peripheral wall extending outwardly from the second face to offset the second face from the exterior surface of the case of the electronic device to form the chamber.

4. The assembly of claim 1 wherein the plurality of chambers comprises four chambers such that each chamber forms a quadrant on the second face.

5. The assembly of claim 1 wherein a vent hole is associated with each of the chambers, the vent hole for each chamber extending through the attachment member in a position corresponding to the respective chamber, the vent hole for a respective chamber being spaced from the injection hole for the same chamber.

6. The assembly of claim 5 wherein the injection hole is located relatively closer to a center of the attachment member and the vent hole being located relatively further from the center of the attachment member.

7. The assembly of claim 6 wherein the locking aperture forms a security slot engageable by a locking element configured to operate with a security slot.

8. The assembly of claim 6 wherein the attachment member has a central portion toward the center of the attachment member and a peripheral portion around the central portion, a section of the first face corresponding to the central portion being raised with respect to a section of the first face corresponding to the peripheral portion, the locking aperture being positioned on the central portion of the attachment member.

9. The assembly of claim 1 wherein the cover member comprises:
  a main wall portion extending substantially parallel to the attachment member when the cover member is mounted on the attachment member; and
  a skirt wall portion extending from the main wall portion, the skirt wall portion extending from the outer boundary of the boundary region such that the outer side of the cover member if convex and the inner side of the cover member is concave.

10. The assembly of claim 9 wherein the main wall portion has a central region and a boundary region, the access aperture being located on the central region, the central region being depressed with respect to the boundary region such that the central region is positionable adjacent to a raised section of the first face of the attachment member.

11. The assembly of claim 1 wherein the cover member is configured to encompass the attachment member when mounted on the attachment member in a manner configured to hide the attachment member from view.

12. The security medallion of claim 1 additionally comprising communications circuitry mounted on the attachment member.

13. The security medallion of claim 12 wherein the communications circuitry includes an RFID tag.

14. The security medallion of claim 12 wherein the communications circuitry is configured to wirelessly emanate electronic communication signals from the security medallion.

15. The security medallion of claim 12 wherein the communications circuitry includes a wireless transceiver operable to transmit an alert to a remote device.

16. The security medallion of claim 12 wherein the communications circuitry includes a GPS chipset.

17. The security medallion of claim 12 wherein the communications circuitry is configured to electrically couple to the electronic device, and wherein the communications circuitry is configurable to cause erasure of data on the electronic device in response to an event sensed by the communications circuitry.

18. The security medallion of claim 1 additionally comprising an accelerometer to detect movement of the security medallion.

19. A system comprising:
  a medallion assembly configured to be secured to an exterior surface of an electronic device, the medallion assembly comprising:
    an attachment member configured to mount on a case of the electronic device, the attachment member having a first face and a second face for orienting toward the case of the electronic device, a locking aperture extending into the attachment member from the first face, the attachment member defining a plurality of chambers defined on the second face, each of the chambers radiating outwardly with respect to a center of the attachment member; and
    a cover member configured to removably mount on the attachment member, the cover member having an outer side and an inner side being oriented toward the attachment member when the cover member is mounted on the attachment member, the cover member defining an access aperture alignable with the locking aperture in the attachment member when the cover member is mounted on the attachment member,
  an applicator structure configured to facilitate application of adhesive to the attachment member for securing the attachment member to the case of the electronic device, the applicator structure comprising:
    an applicator disk configured to be positioned adjacent to the attachment member, the applicator disk having a top surface and a bottom surface.

* * * * *